(No Model.)
A. G. ANDERSON.
GAS AND WATER BOX FOR STREETS.
No. 439,048. Patented Oct. 21, 1890.
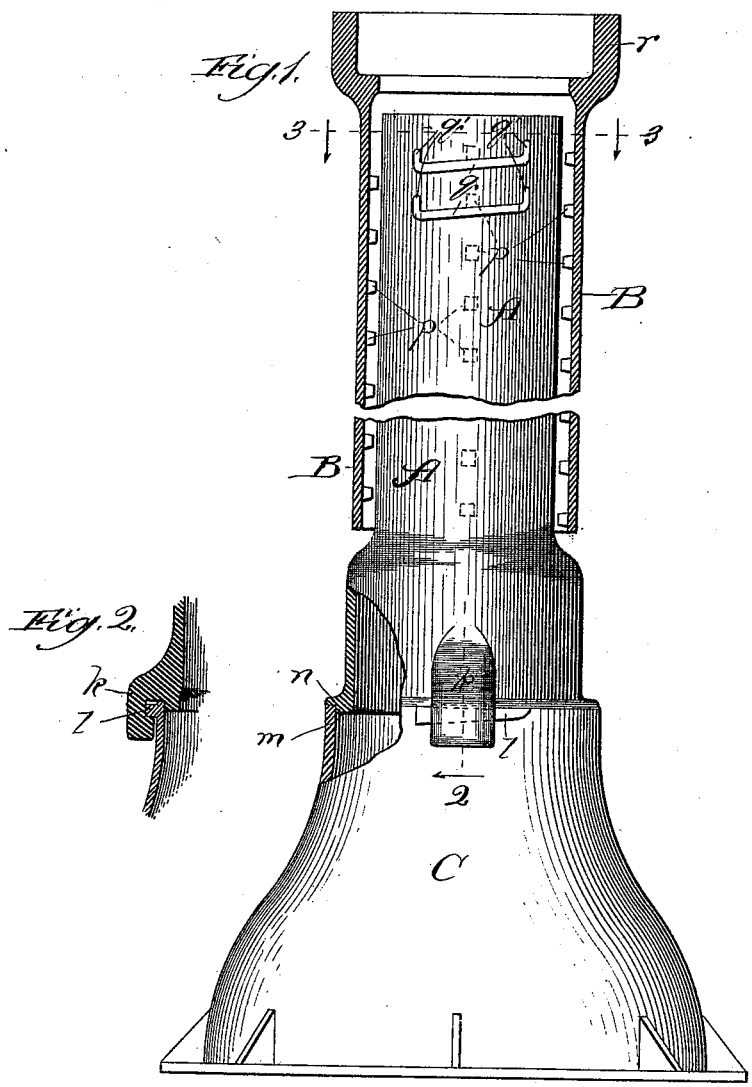
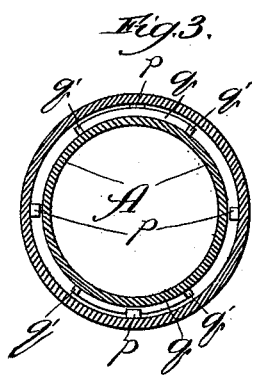
Witnesses:
Inventor,
Anton G. Anderson,

UNITED STATES PATENT OFFICE.

ANTON G. ANDERSON, OF CHICAGO, ILLINOIS, ASSIGNOR TO THE ILLINOIS MALLEABLE IRON COMPANY, OF SAME PLACE.

GAS AND WATER BOX FOR STREETS.

SPECIFICATION forming part of Letters Patent No. 439,048, dated October 21, 1890.

Application filed June 13, 1890. Serial No. 355,348. (No model.)

*To all whom it may concern:*

Be it known that I, ANTON G. ANDERSON, a citizen of the United States, residing at Chicago, in the county of Cook and State of Illinois, have invented a new and useful Improvement in Gas and Water Boxes for Streets, of which the following is a specification.

My invention relates to an improvement in the class of gas or water box comprising, generally stated, two telescoping pipes, the inner one being provided with a suitable base and the outer one with a suitable cap, and means—such as a screw-thread—being provided on each whereby when the inner pipe is operatively located and stationary, as by being embedded in the ground, the outer pipe may be readily adjusted by turning it to lengthen or shorten the box by raising or lowering the outer pipe to a desired level.

The objects of my improvement are to provide novel and highly efficacious means for readily enabling desirably accurate adjustment of the outer pipe to be accomplished in a box of the nature stated, whether it be employed as a "valve-box," a "service-box," or a "ventilating-box," these being terms expressive of different uses, to which the general construction involved in such boxes may be applied.

My invention consists in the general construction of my improvements, and it also consists in details of construction and combinations of parts.

In the accompanying drawings, Figure 1 is a view in broken sectional elevation of my improved box on a base for adapting the device for use as a service-box; Fig. 2, a section taken on the line 2 of Fig. 1 and viewed in the direction of the arrow, and Fig. 3 a section taken on the line 3 3 of Fig. 1 and viewed in the direction of the arrows.

A denotes the inner or stationary pipe, and B is the outer or extension pipe, which should be adapted to support at its upper end a cover or cap, (not shown,) as by expanding it into a seat $r$.

On the pipe A, near its upper end, I provide seats $q$ in any desired number, but on opposite sides of the pipe and alternating with each other in series on such opposite sides. Thus if only one seat be provided at each side of the pipe one would be higher than the other. If, as shown, two seats $q$ be provided on each side, the highest on one side will be nearer the upper end of the pipe than the highest on the opposite side, the next higher on the first-named side will be lower than the first on the opposite side, but higher than the second on such first-named side, and so on to the ends of the opposite perpendicular series of seats. I prefer to form the seats $q$ in the form of elongated bearings projecting from and extending in the direction circumferentially of the pipe, and having at their opposite extremities upwardly-projecting lugs $q'$, and the best result is attainable by slanting the seats or causing them all to extend diagonally in the same direction, as shown.

Inside the outer or extension pipe B, I provide on the inner surface thereof arranged in, preferably, four perpendicular series, (in pairs of such series opposite each other in the pipe,) with any desired number in each series, and with a space between each pair of such series wider than the seats $q$, whereby they may be passed without obstruction in inserting the pipe A into the pipe B, or rather in adjusting the pipe B over the pipe A. The distance between each pair of adjacent studs $p$ in each perpendicular series thereof is greater than the perpendicular width of each seat $q$, whereby the latter may, on turning the pipe B, be introduced between the studs, at which the outer pipe will be supported on the inner one by the studs resting on the seats between their lugs $q'$, which prevent the unseating of the outer pipe by turning it without first raising it to cause the supporting-studs to clear the lugs $q'$. The studs $p$ are arranged in spiral series around the inner surface of the outer pipe, whereby the members of one perpendicular series alternate in height with those of an adjacent such series, those of the latter with the members of the next adjacent series, and the last named with those of the last or lowest extending perpendicular series.

To adjust the parts A and B of the box when the first named is secured in its rigid operative position, the pipe B is caused to slip over it by bringing it into proper position for the purpose with the vertical series of seats $q$, coinciding with the opposite spaces between adjacent vertical series of studs $p$, the spaces being wider than the length of the seats $q$, and when the outer pipe has been thus slipped over the inner to the desired extent to cause it to extend upward to the required or nearly to the required height it is turned to cause the studs $p$ nearest such height to enter between an alternating pair of seats $q$ at opposite sides of the pipe A, whereby the outer pipe may be supported by the inner one. By still further turning the pipe B on its seats $q$ it may be raised or lowered to a nicety by turning it in the direction up or down the inclines of the seats $q$. To separate the pipe B after being once so adjusted, it must, obviously, be first lifted perpendicularly to raise the studs $p$, on which it has been resting, above the plane of the lugs $q'$ on the respective seats $q$ before it can be turned to bring the seats in the spaces between the perpendicular series of studs $p$ to permit the outer pipe to be freely raised and lowered for the adjustment. Of course, instead of providing the studs $p$ on the pipe B and the seats on the pipe A without departing from my invention the studs may be on the outer surface of the inner pipe and the seats on the inner surface of the outer pipe. I prefer, however, the arrangement as shown.

The base C involves a construction especially designed to adapt my improved device for a valve-box. To that end I form on the lower end of the pipe A a horizontal circumferential flange $n$, at which the pipe rests on the upper edge of the base, and a stop-flange $m$, extending below the seat-flange $n$ and fitting inside the opening at the upper end of the base, and at diametrically-opposite sides of the base near its upper end I provide cam-lugs $l$ to be engaged by clips $k$, suitably formed on opposite sides of the pipe A and extend below its lower end, which should fit the base, and to that end may be expanded, as shown, the clips $k$ so extending downward from the pipe as to overlap the upper edge of the base C and coincide with the cam-lugs.

When the pipe A is applied to its supporting-base C, the latter forms a secure seat for it, owing to the circumferential flanges $n$ and $m$, and by turning the pipe so as to cause the clips $k$ to embrace the cam-lugs, the pipe may be readily and securely locked in place by the wedging effect of the cam-lugs in the clips, produced by adequately turning the pipe in the proper direction.

The construction of the telescoping pipes A and B may be advantageously used for other purposes than those described, as for covering vertical steam-pipes between the floors in buildings, and I desire to be understood as intending to claim it for such other purposes.

What I claim as new, and desire to secure by Letters Patent, is—

1. The combination of the telescoping pipes A and B, one having seats $q$ provided one below the other on the opposite sides of one surface, and the other having perpendicular series of studs $p$, the members of which alternate with each other at opposite sides of the surface opposed to that carrying the said seats, and the longitudinal spaces between which series of studs are wider than the length of the seats $q$, whereby one pipe may readily be moved lengthwise to any desired extent to adjust it with relation to the other when the said seats and spaces coincide, substantially as described.

2. The combination of the telescoping pipes A and B, one having seats $q$ provided one below the other on the opposite sides of one surface, and the other having perpendicular series of studs $p$ arranged spirally around its surface opposed to that carrying the said seats, and the longitudinal spaces between which series of studs are wider than the length of the seats $q$, whereby one pipe may readily be moved lengthwise to any desired extent to adjust it with relation to the other when the said seats and spaces coincide, substantially as described.

3. The combination of the telescoping pipes A and B, one having diagonal seats $q$ provided one below the other on the opposite sides of one surface, and the other having perpendicular series of studs $p$ arranged spirally around its surface opposed to that carrying the said seats, and the longitudinal spaces between which series of studs are wider than the length of the seats $q$, whereby one pipe may readily be moved lengthwise to any desired extent to adjust it with relation to the other when the said seats and spaces coincide, substantially as described.

ANTON G. ANDERSON.

In presence of—
  W. H. DYRENFORTH,
  M. J. FROST.